William R. Mercer
INVENTOR.
BY

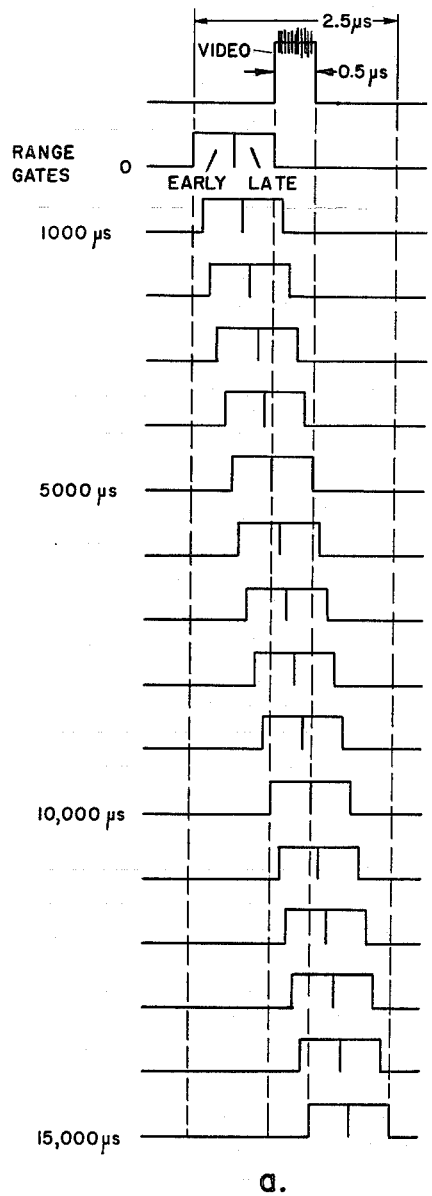
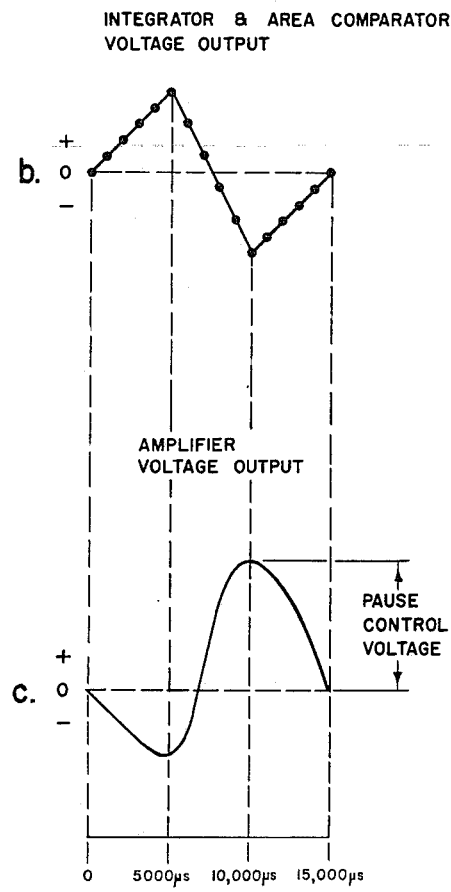
Fig. 4

June 4, 1963　　　W. R. MERCER　　　3,092,831
AUTOMATIC RANGE TRACKING RADAR SYSTEM
Filed May 17, 1954　　　　　　　　　　　7 Sheets-Sheet 5
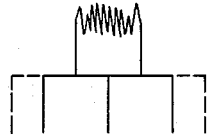
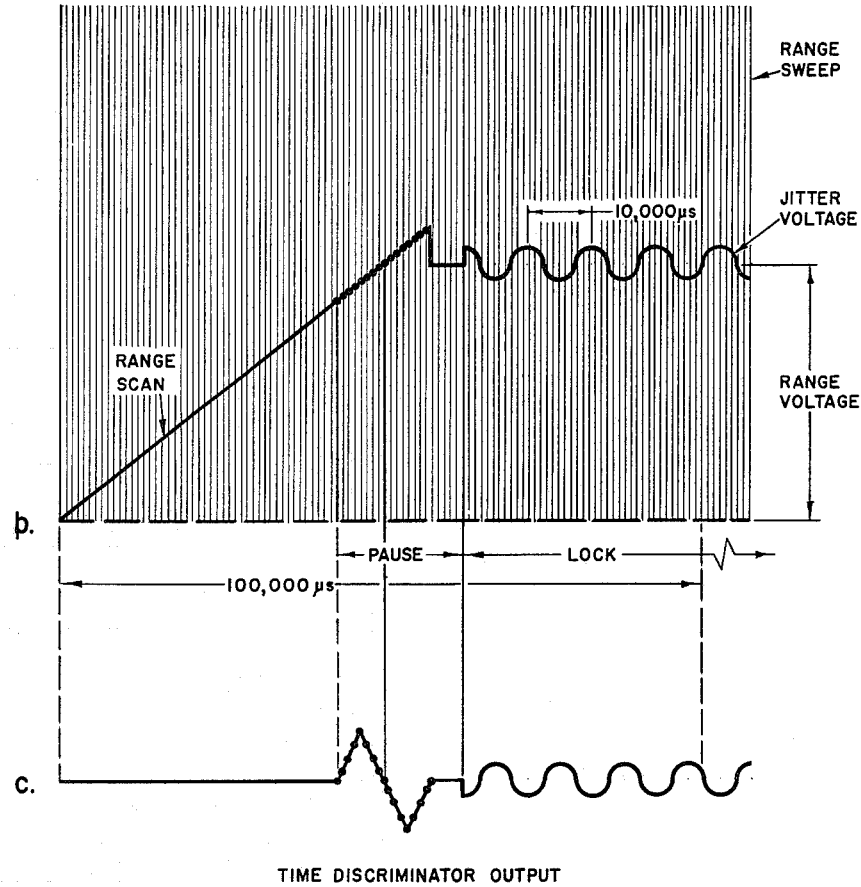
TIME DISCRIMINATOR OUTPUT
Fig.5
William R. Mercer
*INVENTOR.*
BY June 4, 1963

W. R. MERCER 3,092,831

AUTOMATIC RANGE TRACKING RADAR SYSTEM

Filed May 17, 1954

William R. Mercer
INVENTOR.

United States Patent Office 3,092,831
Patented June 4, 1963

3,092,831
AUTOMATIC RANGE TRACKING RADAR SYSTEM
William R. Mercer, Belmont, Mass., assignor, by mesne assignments, to Sanders Associates, Incorporated, Nashua, N.H., a corporation of Delaware
Filed May 17, 1954, Ser. No. 430,225
9 Claims. (Cl. 343—7.3)

This invention relates to the art of radar. It particularly relates to automatic target tracking systems of gun fire control devices which transmit a series of pulses of radio frequency energy for target detection. In such systems either the target, the radar, or both, may be in motion.

The invention applies to the general problem of detecting the presence of and determining the range or distance of an object with respect to the radar. The object may, of course, be present on land, sea or in the air.

An object of the invention is to provide an improved target range tracking system having an increased sensitivity to the presence of a target;

A further object is to provide a system of the type described with improved means for selecting a true target while discriminating against false target indications;

A further object is to provide a system of the type described with means for selecting a desired or true target signal having an energy level less than that of the level of the background noise;

A further object of the invention is to provide a system of the type described with an improved target signal lock-on in the event of momentary fading of the true target signal; and A further object is to provide a system of the type described with means for automatically maintaining the sensitivity of the system at a predetermined level to compensate for the effects of environmental changes and variations in the electrical characteristics of its components.

For clarity of expression the following remarks are confined to a particular problem of air borne fire control radar.

Standard airborne fire control radar equipments transmit pulses of radio frequency energy into space, at a typical repetition rate or duty cycle of, for example, 1000 pulses per second. If a pulse of energy strikes a target some of it is reflected and returned to the radar receiving set. The time required for the pulse to travel from the radar to the target and return is measured and translated into range information (one mile is roughly equivalent to 10 microseconds).

In the standard airborne fire control radar, as presently employed, the pilot is notified of the appearance of a target by a suitable alerting or alarm device. The mechanism responsible for triggering this device is included in the automatic target tracking system. It is this system to which this invention relates and upon which we claim superior performance.

Standard circuitry responds to spurious target indications such as transient and random noise pulses, various jamming signals and land, sea and cloud reflections. The use of the present invention considerably reduces the number of false target indications to the pilot due to such noise and reflections from indiscrete targets. A discrete target may be defined as being a target with a mass and reflecting areas on the order of an aircraft. Indiscrete targets, then, may be defined as objects which tend to simulate the above but are due to the more or less random motion of relatively minute bodies.

Again referring to standard radar practice, the pulses are transmitted at, for example, 1000 pulses per second. Sawtooth wave pulses of a duration of 10 microseconds are generated, triggered by the transmitted pulses. The sawtooth wave constitutes a linearly rising voltage, the duration of which corresponds to the effective range of the radar. A sweep system is provided continuously to scan the entire effective range at a relatively slow rate, typically 2 times per second, at most 3 times per second. At the time of coincidence between the 1000 pulse per second sawtooth voltage and the 2 cycle scan voltage, a gate system is triggered, as hereinafter explained, to permit close examination of a relatively small portion of the range. This slow continuous scanning is maintained as long as no target indication appears within the range of the radar.

In the event of a target indication, the received pulse is amplified, detected (thereafter referred to as video) and used to trigger the lock-on system. The scanning is stopped and the system locks on the target. At this stage the pilot is notified, by the alerting or alarm device, and he may then fire.

In conventional systems any signal present of sufficient amplitude to exceed the noise threshold has been able to trigger the lock-on system and stop the 2 cycles per second range scanning. Thus, automatic tracking in its conventional form, either subjects the pilot to an excess of false target indications or must operate at reduced detection sensitivity.

The present invention provides a combination of means for effecting the "pause-lock" function with a coherence sampling or auto-correlation check. The use of the coherence check permits relatively high frequency scanning; typically 10 cycles per second and upper bound as high as is consistent with the other design requirements in the system.

Upon receipt of a target indication the pause-lock system stops the 10 cycle scanning function; a low frequency oscillator (on the order of 100 cycles per second) is then employed to "jitter" (repeatedly vary the time position of) the scanning gate with respect to the received pulse. The signal output of the system may then be compared to the "jittering" voltage, with respect to the phase and amplitude, and it, thereby, may be determined whether or not it represents a true target. If the answer is affirmative, the system continues to lock on the target and follow it. If the answer is negative, the 10 cycle scanning system stop is removed and scanning of the range is resumed. The pause threshold is a function of the rate at which pauses occur and is automatically determined by the pause counting circuit.

It requires about 0.2 second for the scanning system to recover; under normal operation from 10 to 15 pauses per minute may be expected in response to possible target indications. The number of pause-locks per minute is not critical. It is important to note that the pilot is not notified of the indication of a target unless the coherence check indicates the presence of a true target. Furthermore, the radar will remain locked on the true target in the presence of signal fading because of the anti-fade circuit that exists (explained fully in detailed circuit description).

The invention will be better understood to those skilled in the art from the following more detailed description of a preferred embodiment thereof, when considered in connection with the accompanying drawings, and its scope will be pointed out in the appended claims.

In the drawings:

FIG. 4 is a group of curves illustrating still other wave forms developed in the system;

FIG. 5 is still another group of curves illustrating still other wave forms developed at other points in the system;

Figure 1:
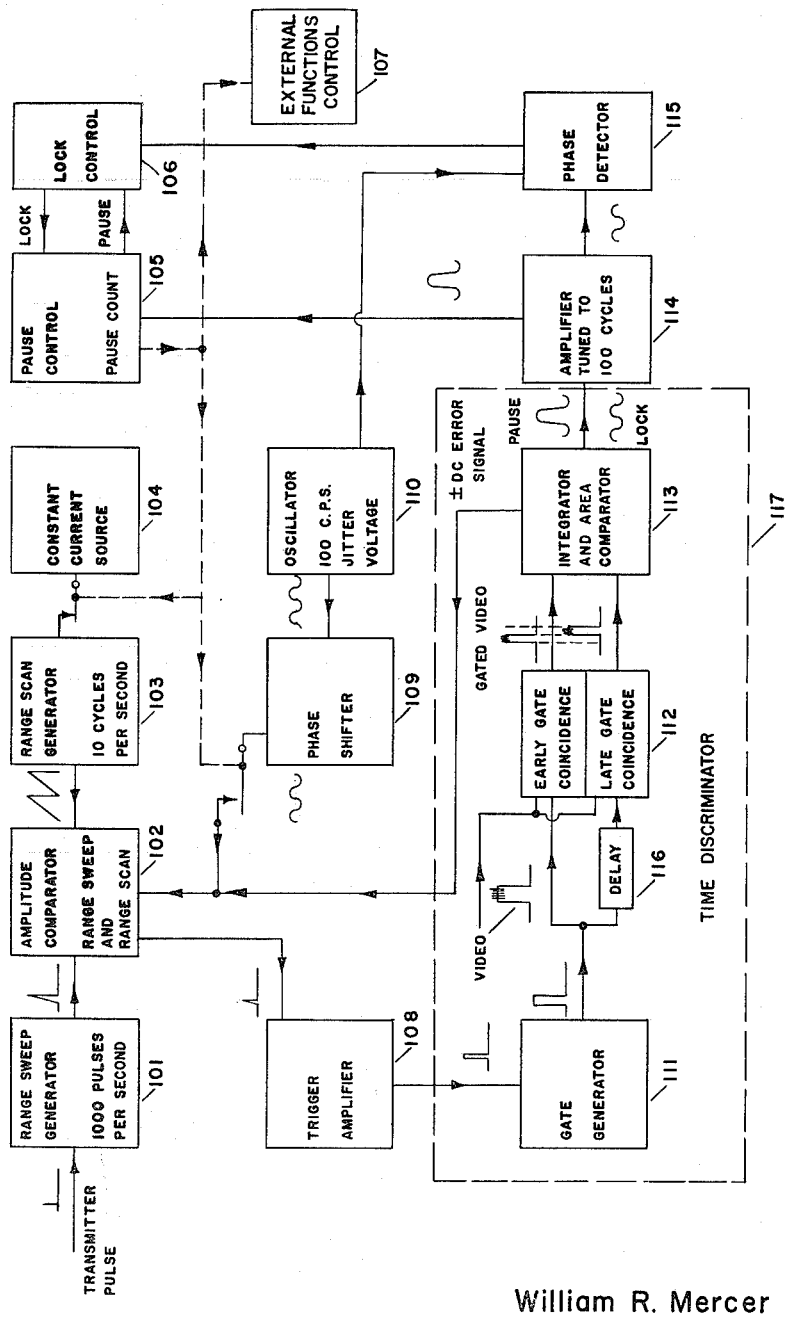
FIG. 1 is a block diagram of that part of a radar system embodying the invention.

Referring now in more detail to the drawings, and particularly to FIG. 1, the time required for the transmitted pulses to travel to the target and return is directly proportional to the distance traveled. By establishing a linear relationship between an arbitrarily varying voltage and this time, a correlation between voltage and distance traveled is obtained. For this reason an equivalence can be said to exist between the elapsed travel time of the transmitted pulse, the distance from the radar set to the target and the instantaneous amplitudes of the range sweep and range scan voltage.

The range sweep provides a time versus voltage reference for measuring elapsed travel time of individual target reflections. The range scan permits more accurate measurement of the travel time of the transmitted pulses by examining a group of the pulses at a time. For this reason, the instantaneous range scan voltage is commonly referred to as the range voltage. Although scan and sweep are technically synonymous, the use of the terms "range sweep" and "range scan" is a convenience employed for clarity of reference. The operation of this system may be considered for two conditions: (1) no target indication present; and (2) apparent target indication.

Figure 2:
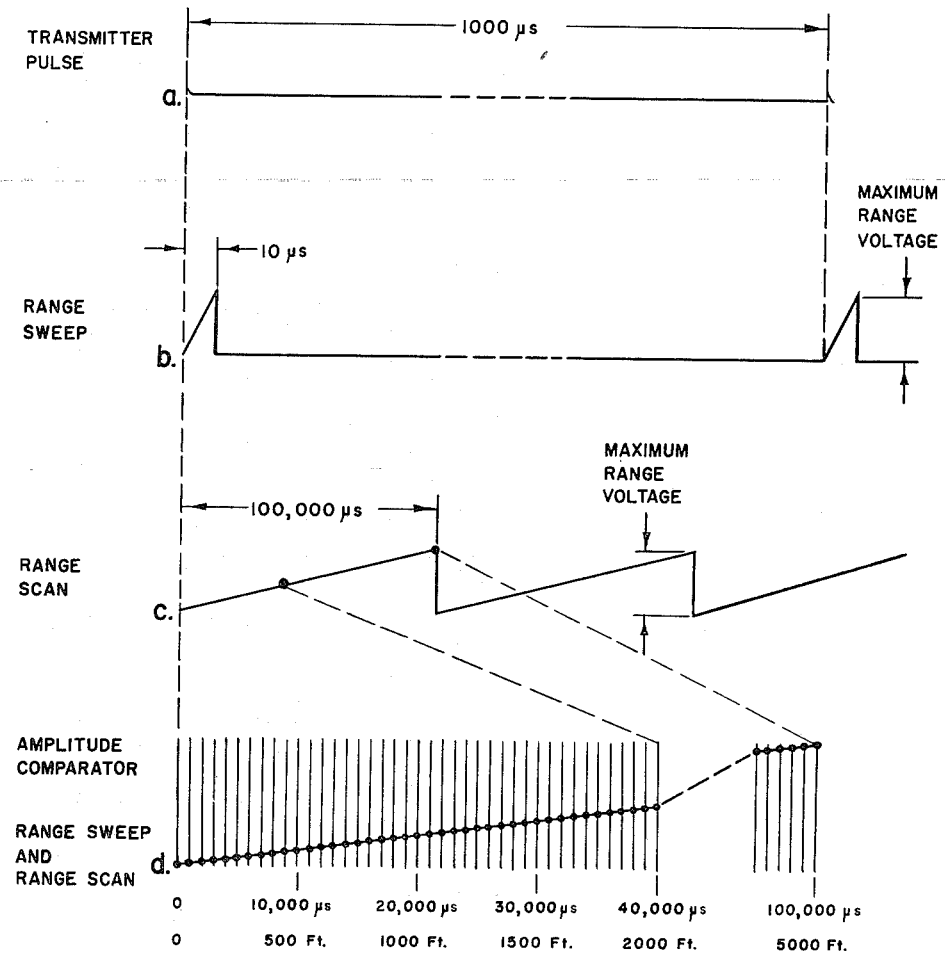
FIG. 2 is a group of curves illustrating wave forms developed in the system of FIG. 1.
Figure 3:
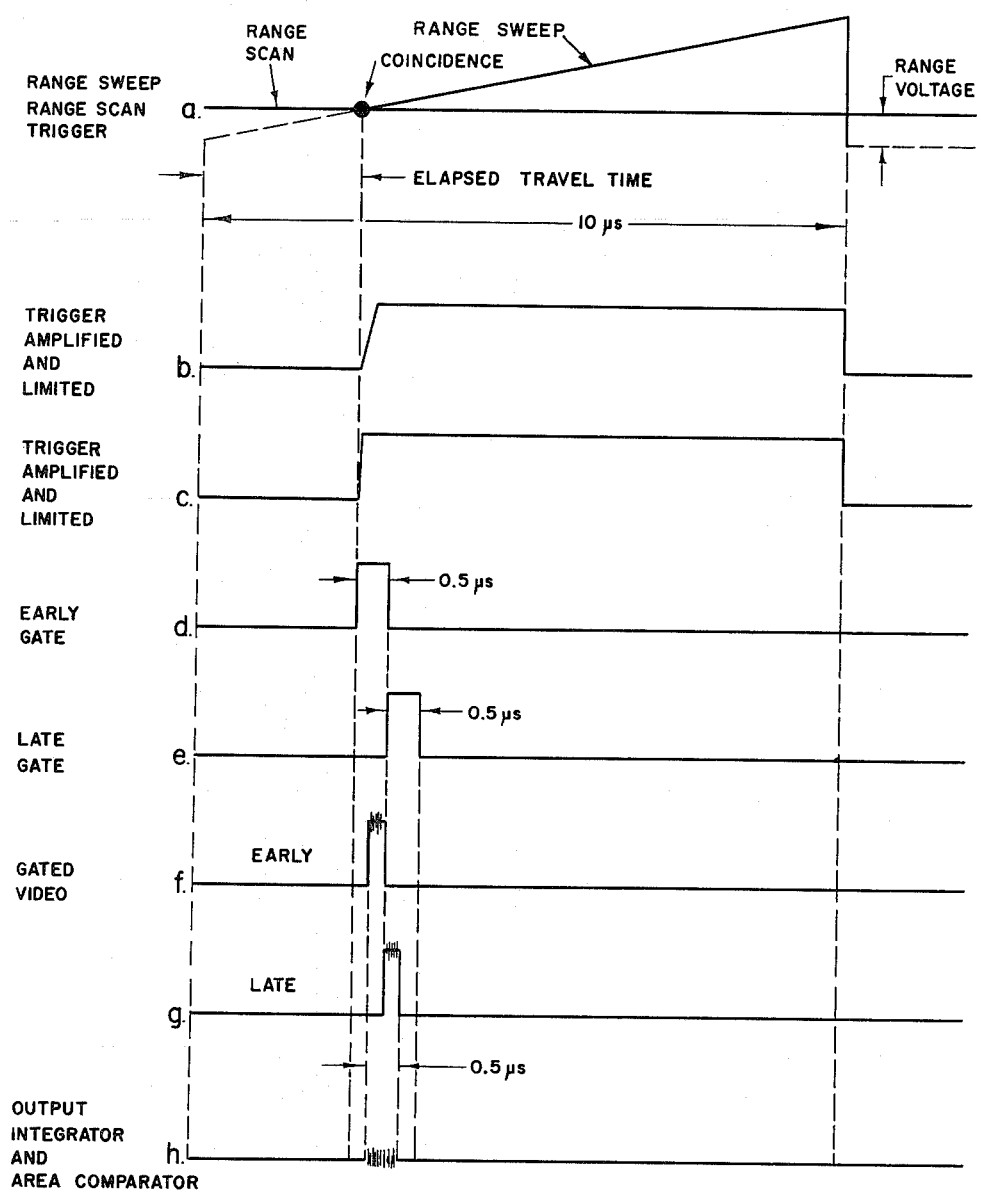
FIG. 3 is a group of curves illustrating other wave forms developed in the system.

Considering first, condition (1), with the release of the transmitted pulse $a$, FIG. 2, an attendant pulse triggers the range sweep generator 101, FIG. 1. The range sweep generator 101 produces a sawtooth voltage pulse $b$, FIG. 2, with a time duration of 10 microseconds that recurs at the repetition rate of the transmitter, in this case 1000 pulses per second, that is 1000 microseconds (0.001 second) apart. Simultaneously the range scan generator 103 produces a 10 cycle per second continuous sawtooth voltage $c$, FIG. 2, that completes the scanning of the range in 100,000 microseconds (0.1 second). These two voltages are applied to the amplitude comparator 102 and there occur coincidences as indicated at $d$, FIG. 2, at which times the instantaneous range sweep voltages are limited by the instantaneous range scan voltage. The output of the amplitude comparator consists of pulse $a$, FIG. 3, comprising that portion of the 10 microseconds' range sweep voltage pulse that remains after coincidence. This pulse is applied to the amplifier 108 where it is amplified and limited as shown by the curves $b$ and $c$, FIG. 3, and applied to the gate generator 111 of the time discriminator circuit 117.

The time discriminator circuit 117 produces a D.C. error signal to enable the system to lock-on a target at the correct range indication, and continue to track the target thereafter. The system consists of the gate generator 111, an early and late gate coincidence circuit 112 and an integration and area comparator circuit 113 designed to integrate the outputs of the coincidence circuits and compare their areas to obtain a differential D.C. voltage output. The coincidence circuits comprise tubes which conduct only at the time that the gating pulse is applied (0.5 microsecond). A delay circuit 116 is provided to introduce a 0.5 microsecond time delay. Thus, there are obtained two gate pulses 0.5 microsecond in time duration, and displaced in time with respect to each other's initiation by 0.5 microsecond.

The signal input to the radar receiver is amplified and detected. In the event of a target indication, the video signal produced is applied to the early and late gate coincidence circuits simultaneously. Since the tubes do not conduct simultaneously, the voltage outputs $f$ and $g$, FIG. 3 (called gated video hereinafter), are displaced in time with respect to each other. The gated video is applied to integrator and comparator 113, integrated and the areas of the two gated signals compared. The output of the integrator and area comparator is a D.C. voltage which seeks to align timewise the gating pulses and the video signal with respect to each other. In this case, the video consists only of noise. Since the noise signals are farily random, the integrated voltages due to noise are fairly equal and produce very little output from the integrator and area comparator 113. The range scanning function continues unimpeded.

Referring now to condition (2), where there is an appearance of a target. In standard system the lock and time discriminator operates as follows: the gated videos are added and applied to a delayed peak detector to fire a lock-on control. The lock-on control circuit includes a tube which is biased above the ambient noise level to reduce false alarms. The need for sensitive target detection, however, is in direct opposition to this practice.

The time discriminator circuit 117 produces a positive voltage output when the scanning gates are early with respect to the video pulse (most of the video pulse appears at the time the late gate coincidence tube 112 is conducting). This positive voltage is applied to the amplitude comparator 102 and causes the trigger pulse of gate generator 111 to occur later. Conversely, if the gates are late, a negative voltage is produced that causes the trigger to occur earlier. The time position of the gates is thus controlled so that the gated video produces no output from the area comparator 113 in the presence of a stationary target.

Referring now to the operation of the present invention, it is desired that the automatic target tracking system find the target, examine it to determine range, verify that it is a true target, lock-on the target if affirmation is received and provide fast scanning to produce more accurate, continuous range information. In the event that the indication proves not to be a true target, it is desired that the system resume scanning the range. To facilitate the analysis of the operation of this system upon the appearance of a target, two basic functions may be considered: (1) the pause-lock which alerts the various control functions in response to the target indication and then awaits verification and either locks on the target or removes the alert; and (2) the coherence check which permits verification of the existence of a true target and permits increased sensitivity of target detection by lowering the signal to noise ratio at which verification may be obtained.

Referring first to the pause-lock function. Given the presence of a target indication, the time discriminator 117 produces one cycle of A.C. voltage (the discriminator S curve) as the system scans the video pulse. It scans the pulse due to the characteristic lag that exists in servo systems and in this system in particular. When the area subtended by the voltage amplitude of the late gated video exceeds that of the early gated video, the integrator and area comparator 113 produces a positive D.C. voltage of proportionate amplitude that adds to the range scan voltage applied to the amplitude comparator 102. When the area subtended by the early gated video exceeds that of the late gated video, the D.C. voltage output becomes negative. In FIG. 4, the several curves illustrate the variation in time positions of the early and late gates, with respect to the video pulse, that are required to accomplish the above scanning function.

The curve $b$, FIG. 4, of the output of the integrator and area comparator 113 is a function of the traverse in time position of the early-late gates with respect to the video pulse. Sixteen range sweep pulses are required to scan the target and the elapsed time is a total of 15,000 microseconds.

The output of the integrator and area comparator 113 is applied to the 100 cycles per second tuned amplifier 114. This amplified signal $c$, FIG. 4, has the peculiar characteristic of having the amplitude of the second half cycle emphasized with respect to the first half cycle. This effect is produced by applying one cycle of an alternating voltage to a low Q parallel resonant circuit; the high damping factor causes further oscillations to damp out quickly. Output of the amplifier 114 is applied to the pause control circuit 105.

The pause control circuit 105 accounts for five important functions:

(1) Stops the range scan generator 103 by removing the constant current source 104 and maintains the range scan voltage at its instantaneous level at that time;

(2) Applies the 100 cycle jitter voltage from the phase shifter 109 and oscillator 110 to the amplitude comparator 102 to obtain a coherence check;

(3) Pulses the pause counter 105 which functions to introduce a delay bias on the pause control tube and restrain the system from responding to an excessive number of pauses per minute;

(4) Alerts the lock control circuit 106 of the presence of the target; and (5) Alerts the external functions control circuit 107 to the presence of the target.

Reference will now be made more particularly to the coherence checking function of the system. The purpose of the time discriminator 117 is to relate the occurrence time of the video with respect to the output of the amplitude comparator 102. Since the time at which the video pulse appears is independent of the automatic target tracking system, the time discriminator 117 seeks to synchronize the output of the amplitude comparator 102 to correspond with it. The output of the amplitude comparator 102 and the video pulse are, in fact, simultaneously applied to the time discriminator 117, of which an output is returned to the amplitude comparator 102 for time alignment. This constitutes a servo loop with a relatively high response time and is independent of the coherence check.

The output of the time discriminator 117 is a D.C. voltage, of which the polarity is a function of whether the amplitude comparator output 102 is ahead of or behind the occurrence time of the video pulse. The time position of the output of the amplitude comparator 102 is arbitrarily varied with respect to the time of the video pulse, at a rate too fast for the abovementioned servo loop to follow. This causes the time discriminator 117 to produce an A.C. voltage after a target indication appears. Since a true target appears relatively stationary, the A.C. voltage produced as a result of a true target indication is related to the 100 cycles per second jitter voltage in a definite way.

In FIG. 5 the curve $a$ illustrates the time positions of the video pulse with respect to the early and late gates. The dotted lines illustrate the displacement in time position of the gate pulses by the jitter voltage. The effect of the application of the jitter voltage to the amplitude comparator 102 is illustrated by curve $b$ in FIG. 5 and the resultant time discriminator output by the curve $c$, FIG. 5.

By applying the time discriminator 117 and jitter oscillator 110 voltages to the phase detector 115, a D.C. voltage output is obtained. The polarity of that voltage can be determined in the presence of a true target by controlling the relationship between the reference jitter voltage and the output of the time discriminator 117 so that they are displaced with respect to each other by zero or 180 degrees. In this system if they are displaced with respect to each other 180 degrees, the output will be negative. Noise fluctuations are removed by a low-pass filter. The negative voltage thus produced is employed to maintain the lock control circuit 106 in the locked condition and thus indicates the presence of a true target.

A bias voltage is applied to the external functions control circuit 107. After a short time delay this bias reduces sufficiently to allow the external functions control relay to be energized. One contact of the relay permits the anti-signal fading circuit to function; i.e., it introduces a time delay in the lock control circuit 106 to maintain a lock on the target in the presence of momentary true target signal fading.

For further control functions, any number of contacts may be added to the external functions control relay. The other two shown in this embodiment have the typical functions of: (1) energizing "On Target" signal light to notify pilot, and (2) applying range information to the fire control computer system.

Referring now to a more detailed description of the circuits illustrated in FIGS. 6 and 7, all voltages mentioned hereinafter are assumed with respect to ground.

Figure 6:
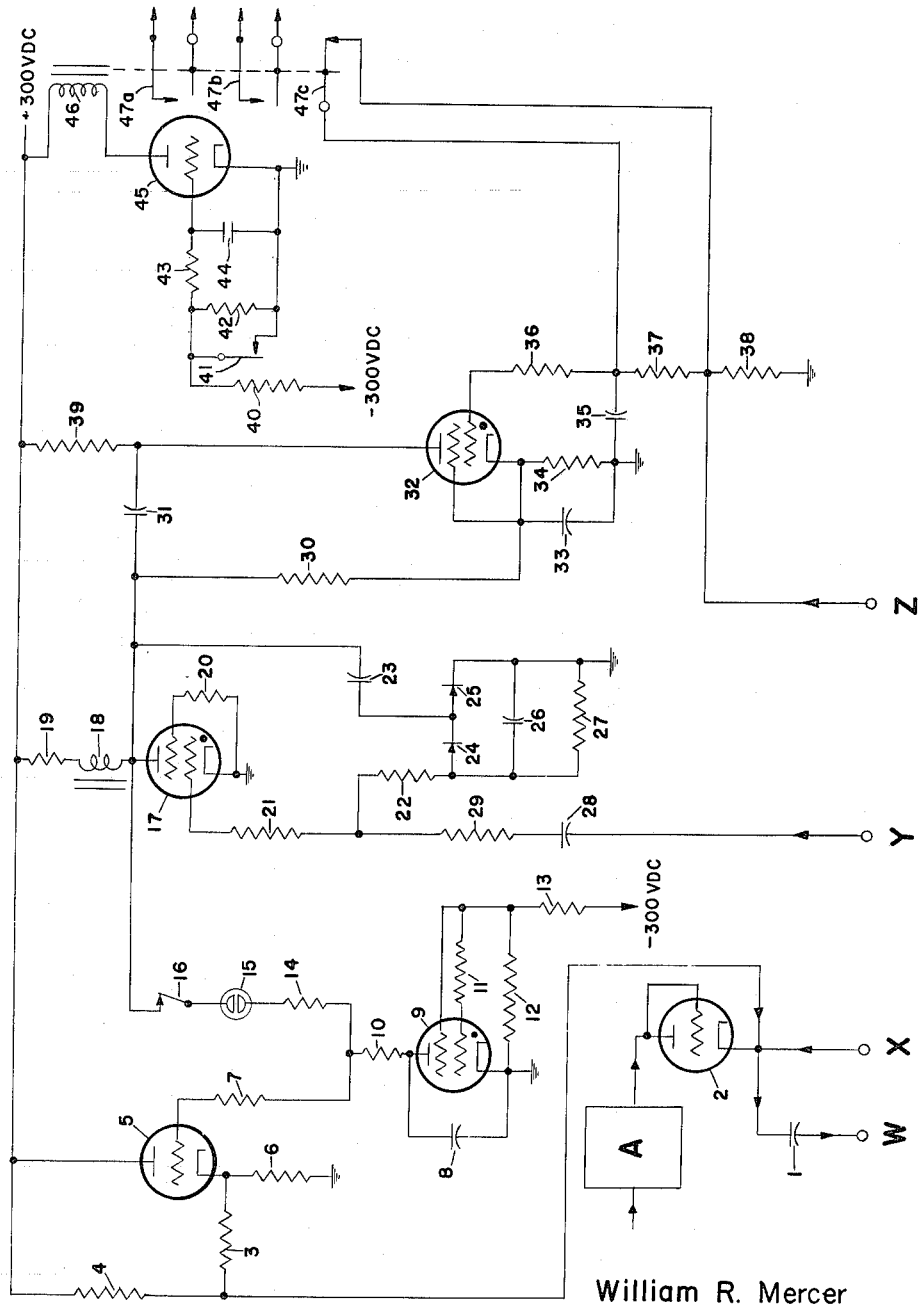
FIG. 6 is a circuit diagram showing the details of certain portions of the system illustrated in FIG. 1.

Considering first the condition when there is present no target indication:

The output of the range sweep generator A, FIG. 6, is applied to the plate of an amplitude comparator tube 2. The output of the range scan generator is applied to cathode of the tube 2.

The range scan generator 103, FIG. 1, is shown in detail in FIG. 6. It comprises a charging capacitor 8 and a tetrode gas discharge tube 9 coupled as shown to a triode cathode follower tube 5. Voltage from across the charging capacitor 8 is applied to a grid of the cathode follower tube 5 through an anti-overshoot resistor 10 and a grid resistor 7. Voltage developed across the charging capacitor 8 is effected by means of a relatively constant current source obtained through resistor 14, neon bulb 15, relay contact 16, relay coil 18, plate resistor 19 to a source of voltage, for example plus 300 volts. A negative bias is applied to the grid of the discharge tube 9 to control the voltage amplitude necessary at the plate to discharge the tube. This negative grid bias voltage is developed across resistor 12 which is in series with voltage dropping resistor 13 and negative 300 volts with respect to ground. Sawtooth voltage output is obtained by charging the capacitor 8 with a constant current until such time as the discharge tube 9 becomes conductive. At that time the charging capacitor 8 discharges through the tube in essentially zero time, quenches the discharge tube 9 and renews the charge cycle.

The plate of the cathode follower 5 is connected directly to plus 300 volts. The cathode follower 5 has a positive cathode bias due to the voltage dividing action of resistor 6, resistor 3 and resistor 4. The output of the range scan generator appears across the cathode resistor 6 and is applied through resistor 3 to the cathode of the amplitude comparator tube 2. The instantaneous voltage on the plate of the comparator tube must be more positive than the instantaneous voltage on the cathode of the comparator tube 2 for this tube to conduct. The output of tube 2 consists of that portion of the range sweep voltage on its plate that exceeds the range scan voltage at its cathode.

Figure 7:
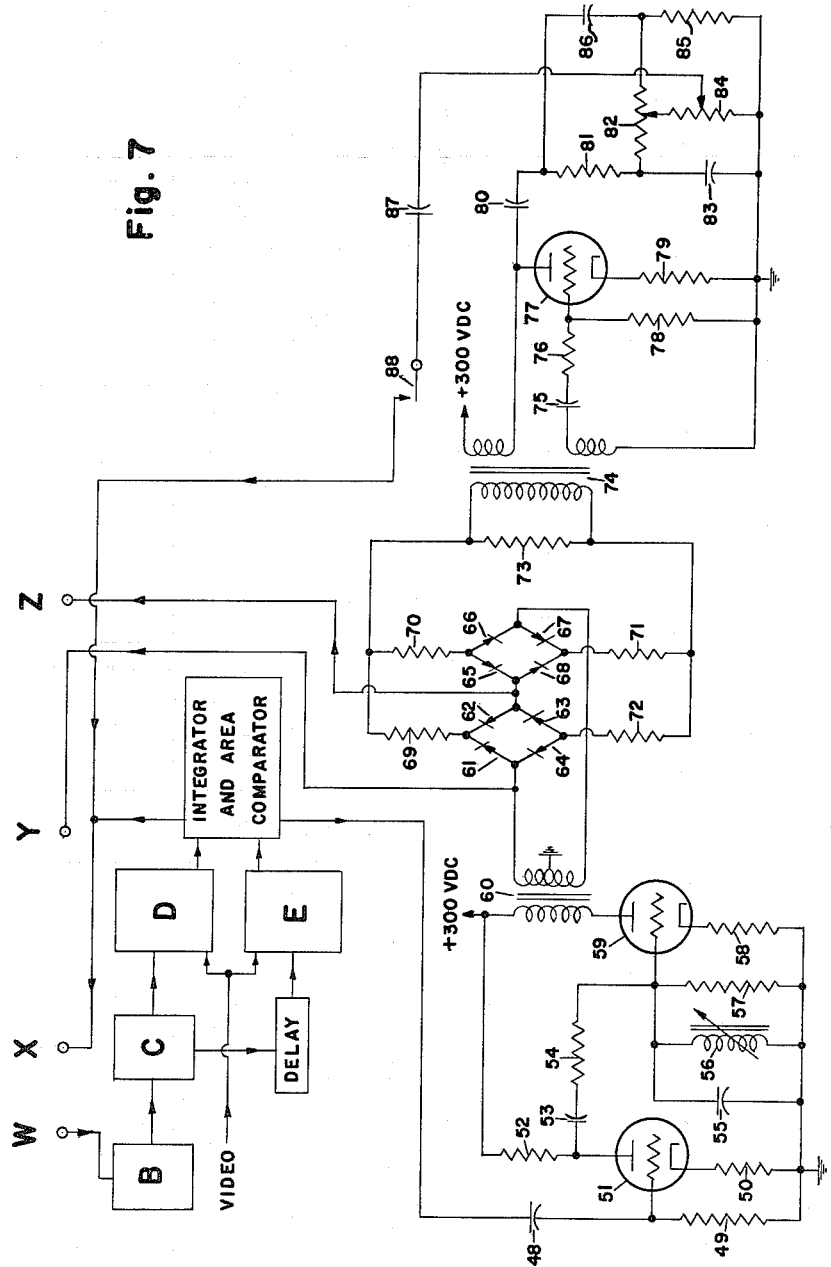
FIG. 7 is a circuit diagram showing the details of certain other portions of the system illustrated in FIG. 1.

The trigger voltage thus formed is coupled through capacitor (connection W, FIGS. 6 and 7) to the trigger amplifier and limiter 108 of FIG. 1 (B of FIG. 7). The output of the trigger amplifier is applied to the gate generator 111 of FIG. 1 (C of FIG. 7). The gate thus produced is applied directly to the early gate coincidence circuit 112 (D of FIG. 7) and through a 0.5 microsecond delay line 1b, FIG. 1, to the late gate coincidence circuit 112 (E of FIG. 7). The gated video thus produced is applied to the integrator and area comparator 113, FIG. 1. In the absence of a target indication no output from the integrator and area comparator can be expected.

Reference is now made to the second condition when there is an appearance of a target indication. There will first be considered the pause-lock function. Upon the initial indication of a target, one cycle of alternating voltage is produced by the integrator and area comparator 113, coupled through capacitor 48 (FIG. 7) to the grid of amplifier 51 of two stage amplifier circuit, the signal being developed across the grid resistor 49. A resistor 50 provides cathode bias for the tube 51 and its plate is connected through a load resistor 52 to a source of voltage, for example 300 volts positive. The amplified signal is coupled through capacitor 53 and resistor 54 to the damped parallel resonant circuit consisting of capacitor 55, variable inductor 56, and damping resistor 57. This circuit is preferably tuned to 100 cycles per second. Emphasis of the second half cycle of a single cycle of alternating voltage is obtained by virtue of its low Q resonant characteristic. The polarity emphasized alternating voltage is amplified by a second triode amplifier 59, cathode bias being developed by resistor 58 and the plate 59 being connected through the plate load primary of transformer 60, to a source of voltage, for example 300 volts positive. The output of transformer 60 is applied to the phase sensitive detector. The voltage that appears across the secondary of transformer 60 is coupled through points "Y" (FIGS. 6 and 7) to the pause control tube 17.

The positive voltage that is emphasized in the second half cycle is coupled through capacitor 28, resistor 29 and resistor 21 to the No. 1 grid of the pause control tetrode gas discharge tube 17, and appears across resistor 22. The pause control tube 17, normally cut-off, conducts and energizes the pause control relay 18.

The pause control tube 17 performs five functions:

(1) It instantaneously stops range scanning. When the pause control tube 17 conducts, the plate voltage goes sharply negative, and removes the charging voltage from capacitor 8 of the range scan generator and quenches (prevents from conducting) the neon bulb (15) which thereafter requires a substantially higher positive voltage to fire (conduct). Relay contact 16 opens a few milliseconds later.

The voltage that is developed across anti-overshoot resistor 10 adds to the positive voltage that appears across capacitor 8 during range scanning and forms part of the range scan voltage. When the constant current charging source is removed, this voltage disappears. This instantaneous negative voltage increment has the effect of more nearly centering the time position of the video pulse with respect to the range gates much faster than is possible for the servo loop in the event of a weak signal.

Since the capacitor 8 has no path for discharge, it maintains a constant voltage on the grid of the cathode follower 5. A steady-state positive voltage is developed across the cathode resistor 6; this is the range voltage. The range voltage is coupled through resistor 3 to the cathode of the amplitude comparator tube 2 and maintains it at a constant positive bias level.

(2) Applies the jitter voltage to the amplitude comparator. The triode oscillator tube 77 has its plate connected to the source of positive voltage through a primary of coupling transformer 74 as indicated at plus 300 volts D.C. A cathode bias is developed across resistor 79. Regeneration is obtained between the plate and grid windings of transformer 74. The output of the grid winding is coupled through capacitor 75, resistor 76 and is applied across grid resistor 78 to the grid of tube 77. One hundred cycles per second jitter voltage is coupled through capacitor 80 to a phase shifting network consisting of resistor 81, capacitor 83, capacitor 86, resistor 85 and variable resistor 82. By means of the variable resistor 82, the phase of the jitter voltage can be so adjusted with respect to the resulting output of the time discriminator as to compensate for undesirable phase variations produced by the circuitry to provide a coherent phase relation when a true target is present.

Variable resistor 84 provides a means for varying the amplitude of the jitter voltage that is then coupled through capacitor 87, normally open contact 88 of pause control relay 18 through points "X" (FIGS. 6 and 7) to the cathode of the amplitude comparator tube 2.

(3) *Pause counting.*—Capacitor 26 is charged negatively with respect to ground by the negative pulse that appears at the plate of the pause control tube 17 and is coupled through capacitor 23 and diode 24 to capacitor 26. Capacitor 26 discharges through resistor 27 and applies a negative bias voltage to the No. 1 grid of the pause control tube 17 that is a function of the rate at which pauses occur. The diode 25 allows capacitor 23 to obtain a positive voltage with respect to ground, but prevents the negative charging voltage for capacitor 26 from being shorted to ground.

(4) The alerting of the lock control tube to presence of a target is accomplished as follows: The lock control tetrode gas discharge tube 32 is normally cut off by a positive voltage developed across resistor 34 through resistor 30, relay coil 18, resistor 19 to the source of positive 300 volts. The capacitor 33 has positive charge with respect to ground. The negative pulse is applied through resistor 30 to the cathode circuit of lock control tube 32 and allows capacitor 33 to discharge through resistor 34. Since grid No. 1 of lock control tube 32 is at ground potential, lock control tube 32 will not conduct until capacitor 33 has discharged to a sufficiently low positive voltage.

(5) The alerting of the external functions control tube to the presence of a target is accomplished as follows: The external functions control tube 45 has its cathode grounded and plate connected through external functions control relay 46 to a source of potential, for example positive 300 volts. A negative grid bias is applied from the source of negative voltage, for example negative 300 volts, through voltage dropping resistor 40 to resistor 42. Capacitor 44 is charged negatively with respect to ground through a resistor 43. When pause control relay 18 is energized its normally open contact 41 closes to remove the negative voltage source (shorts out resistor 42); capacitor 44 discharges through resistor 43. External control tube 45 will not conduct until capacitor 44 has discharged to a sufficiently low negative voltage.

In the presence of a true target, the output of the phase detector due to the coherence check (as will be described below) is a negative voltage applied through external functions control relay contact 47c to charge the capacitor 35 negatively with respect to ground. This negative voltage is applied through resistor 36 to grid No. 1 of lock control tube 32 to maintain it cut off. External functions control tube 45 will then conduct and energize external functions control relay 46. Contacts 47a and 47b may be used to perform external control functions such as: (1) energizing "On Target" light (notifying the pilot of the presence of a target); and (2) applying the range voltage to the fire control computer system.

Contact 47c opens to enable functioning of the antifade control circuit, capacitor 35 and resistor 37. The purpose of the circuit is to maintain the automatic target tracking system locked on the target in the presence of momentary fading of a true target signal. Capacitor 35 discharges through resistor 37 to maintain a negative bias voltage on grid No. 1 of the lock control tube 32; thus, continues to hold the lock control tube 32 cut off in anticipation of the continuing presence of the target.

In the event the coherence check proves that the target indication is false, no output from the phase detector is forthcoming. Capacitor 33 is allowed to discharge until the lock control tube 32 fires and produces a negative pulse across plate resistor 39 quenching itself. The negative pulse is coupled through capacitor 31 to the plate of pause control tube 17 and quenches it. The voltage at the plate of the pause control tube is restored to a higher positive level, produces a positive voltage across resistor 34 to restore cathode bias on lock control tube 32 to maintain it cut off, and de-energizes the pause control relay 18. Relay contact 16 closes to renew range scanning, relay contact 88 opens to remove the jitter voltage from the amplitude comparator tube 2, and relay contact 41 opens to maintain external functions control tube 45 cut off by re-establishing the negative bias voltage at its grid.

The coherence check is performed as follows:

When the jitter voltage is applied to the cathode of the amplitude comparator tube 2, the time discriminator produces an A.C. voltage that is amplified and applied through the secondary of plate transformer 60 to the full wave bridge phase detector. Jitter voltage oscillator 77 output is applied to the phase detector through coupling transformer 74 and load resistor 73.

Since the phase characteristic of noise is completely random, the output of the phase detector due to noise will have a zero average D.C. level. When the phase of the signal voltage is displaced 180 degrees with respect to the reference voltage, the phase detector is acted upon by the reference voltage in such a manner as to allow the signal to be rectified and produce a negative D.C. voltage output. The output of the phase detector is coupled through points "Z" (FIGS. 6 and 7), developed across resistor 38, and through relay contact 47c, charges capacitor 35 negatively. The noise fluctuations are removed by the use of a low-pass filter consisting of by-pass capacitor 35 and the internal impedance of the phase detector. As described above, the negative voltage thus developed across resistor 38 is employed to hold the lock control tube 32 cut off.

The phase of the signal voltage may be displaced as much as ±45 degrees with respect to the reference voltage without materially affecting the sensitivity of the system. This is another reason that the system is said to be noncritical with respect to environmental changes and variations in component characteristics.

In the preferred embodiment of the invention illustrated, elements having the following values have been used:

Capacitor 1—0.00056 micrfarad; vacuum tube 2—½ 12AX7; resistor 3—100,000 ohms; resistor 4—470,000 ohms; vacuum tube 5—½ 12AT7; resistor 6—10,000 ohms; resistor 7—560,000 ohms; capacitor 8—1.0 microfarad; gas discharge tube 9—2D21; resistor 10—4,700 ohms; resistor 11—390,000 ohms; resistor 12—390 ohms; resistor 13—330,000 ohms; resistor 14—82,000 ohms; neon bulb 15—NE-2; relay contact 16—normally closed contact of relay 18; gas discharge tube 17—2D21; relay coil 18—14,000 ohms; resistor 19—27,000 ohms; resistor 20—1 megohm; resistor 21—5.6 megohms; resistor 22—2.2 megohms; capacitor 23—0.0022 microfarad; selenium diodes 24 and 25—Federal 123D1192; capacitor 26—1.0 microfarad; resistor 27—6 megohms; capacitor 28—0.0056 microfarad; resistor 29—1 megohm; resistor 30—560,000 ohms; capacitor 31—0.0056 microfarad; gas discharge tube 32—2D21; capacitor 33—10.0 microfarads; resistor 34—15,000 ohms; capacitor 35—0.5 microfarad; resistor 36—2.2 megohms; resistor 37—2.2 megohms; resistor 38—270,000 ohms; resistor 39—470,000 ohms; resistor 40—1 megohm; relay contact 41—normally closed contact of relay 18; resistor 42—100,000 ohms; resistor 43—330,000 ohms; capacitor 44—0.5 microfarad; vacuum tube 45—½ 12AT7; relay coil 46—14,000 ohms; relay contacts 27a and 47b—normally open contacts of relay 46, relay contact 47c—normally closed contact of relay 46; capacitor 48—0.1 microfarad; resistor 49—1 megohm; resistor 50—1,000 ohms; vacuum tube 51—½ 12AX7; resistor 52—47,000 ohms; capacitor 53—0.1 microfarad; resistor 54—150,000 ohms; capacitor 55—0.1 microfarad; inductor 56—UTC VI–C19; resistor 57—47,000 ohms; resistor 58—820 ohms; vacuum tube 59—½ 12AT7; transformer 60—UTC A–19; selenium diodes 61 through 68—Federal 123D1192; resistors 69 through 72—47,000 ohms; resistor 73—470,000 ohms; transformer 74—UTC A–19; capacitor 75—0.01 microfarad; resistor 76—1 megohm; vacuum tube 77—½ 12AT7; resistor 78—47,000 ohms; resistor 79—680 ohms; capacitor 80—0.1 microfarad; resistor 81—270,000 ohms; resistor, variable, 82—1 megohm; capacitor 83—0.01 microfarad; resistor, variable, 84—5 megohms; resistor 85—270,000 ohms; capacitor 86—0.01 microfarad; capacitor 87—0.1 microfarad; and relay contact 88—normally open contact of relay.

While there has been hereinbefore described what is at present considered a preferred embodiment of the invention, it will be apparent that many and various changes and modifications may be made with respect to the embodiment illustrated, without departing from the spirit of the invention. It will be understood, that all those changes and modifications as fall fairly within the scope of the present invention, as defined in the appended claims, are to be considered as a part of the present invention.

What is claimed is:

1. In a radar system including means for transmitting radio frequency energy pulses and receiving reflected pulses, an automatic target tracking system for producing range information, comprising means for examining received pulses from a particular increment of a predetermined range to determine the presence of a target therein; scanning means for controlling said examining means continuously to effect a continuous examination of successive range increments; pause means responsive to received pulses having energy above a predetermined level for momentarily interrupting said scanning means to permit range indications from a particular range increment; and means for increasing the sensitivity of said pause means inversely to the rate of said interruptions.

2. In a radar system including means for transmitting radio frequency energy pulses and receiving reflected pulses, an automatic target tracking system for producing range information, comprising means for examining received pulses from a particular increment of a predetermined range to determine the presence of a target; scanning means for controlling said examining means to effect continuous examination of successive range increments; pause means responsive to received pulses having energy above a predetermined level for momentarily interrupting said scanning means to permit range indications from a particular range increment; and means responsive to the presence of a target for increasing the sensitivity of said pause means.

3. In a radar system including means for transmitting radio frequency energy pulses and receiving reflected pulses, an automatic target tracking system for producing range information, comprising means for examining received pulses from a particular increment of a predetermined range to determine the presence of a target therein; scanning means for controlling said examining means to effect a continuous examination of successive range increments; pause means responsive to received pulses having energy above a predetermined level for momentarily interrupting said scanning means to permit range indications from a particular range increment; means for controlling the operation of said examining means to coincide with the occurrence of said received pulses individually to produce more accurately said range indications; a phase reference means for varying the time of occurrence of the operation of the examining means with respect to the time of occurrence of the individually received pulses; phase comparison means for comparing the phase of the variation in time of said examining means with respect to the phase of the phase reference means; and lock-on means responsive to said phase comparison means to maintain said interruption of said scanning means and permit continuous range indications of said discrete target.

4. In a radar system including means for transmitting radio frequency energy pulses and receiving signal pulses of said energy reflected from a target, an automatic target tracking system for producing range information, comprising means for examining received pulses from a particular increment of a predetermined range to determine the presence of a target therein; scanning means for controlling said examining means to effect a continuous examination of successive range increments; pause means responsive to received pulses having energy above a predetermined level for momentarily interrupting said scanning means to permit range indications from a particular range increment; means responsive to a plurality of received signal pulses coherent in time relative to the elapsed transmission time to and from a target to produce a control voltage to indicate, thereby, the presence of a true target; and lock-on means responsive to said control voltage to maintain said interruption of said scanning means and permit continuous range indications of said true target.

5. In a radar system including means for transmitting radio frequency energy pulses and receiving signal pulses of said energy reflected from a target, an automatic target tracking system for producing range information, comprising means for examining received pulses from a particular increment of a predetermined range to determine the presence of a target therein; scanning means for controlling said examining means to effect a continuous examination of successive range increments; pause means responsive to received pulses having energy above a predetermined level for momentarily interrupting said scanning means to permit range indications from a particular range increment; means for increasing the sensitivity of said pause means inversely to the rate of occurrence of said interruptions; means responsive to a plurality of received signal pulses coherent in time relative to the elapsed transmission time to and from a target to produce a control voltage to indicate, thereby, the presence of a true target; and lock-on means responsive to said control voltage to maintain interruption of said scanning means and permit continuous range indications of said true target.

6. In a radar system including means for transmitting radio frequency energy pulses and receiving signal pulses of said energy reflected from a target, an automatic target tracking system for producing range information, comprising means for examining received pulses from a particular increment of a predetermined range to determine the presence of a target; scanning means for controlling said examining means to effect a continuous examination of successive range increments; pause means responsive to received pulses having energy above a predetermined level for momentarily interrupting said scanning means to permit range indications from a particular range increment; means responsive to the presence of a target for increasing the sensitivity of said pause means; means responsive to a plurality of received signal pulses coherent in time relative to the elapsed transmission time to and from a target to produce a control voltage to indicate, thereby, the presence of a true target; and lock-on means responsive to said control voltage to maintain interruption of said scanning means and permit continuous range indications of said true target.

7. In a radar system including means for transmitting radio frequency energy pulses and receiving signal pulses of said energy reflected from a target, an automatic target tracking system for producing range information, comprising means for examining received pulses from a particular increment of a predetermined range to determine the presence of a target therein; scanning means for controlling said examining means to effect a continuous examination of successive range increments; pause means responsive to received pulses having energy above a predetermined level for momentarily interrupting said scanning means to permit range indications from a particular range increment; means for controlling the operation of said examining means to coincide with the occurrence of said received pulses individually to produce more accurately said range indications; means responsive to a plurality of received signal pulses coherent in time relative to the elapsed transmission time to and from a target to produce a control voltage to indicate, thereby, the presence of a true target; and lock-on means responsive to said control voltage to maintain interruption of said scanning means and permit continuous range indications of said true target.

8. In a radar system including means for transmitting radio frequency energy pulses and receiving reflected pulses, an automatic target tracking system for producing range information, comprising means for examining received pulses from a particular increment of a predetermined range to determine the presence of a target therein; scanning means for controlling said examining means to effect a continuous examination of successive range increments; pause means responsive to received pulses having energy above a predetermined level for momentarily interrupting said scanning means to permit range indications from a particular range increment; means responsive to a plurality of received signal pulses coherent in time relative to the elapsed transmission time to and from a target to produce a control voltage to indicate, thereby, the presence of a true target; lock-on means responsive to said control voltage to maintain interruption of said scanning means and permit continuous range indications of said true target; and delay means for maintaining the operation of said lock-on means during momentary interruptions of received pulses from said true target.

9. In a signaling system, the combination of: means for transmitting signal pulses of energy to a target; means for receiving from said target corresponding signal pulses initiated by said energy; means coupling said transmitting and receiving means for determining the elapsed time between the individual transmitted and corresponding received pulses to establish a time coherence therebetween; jitter means coupled to said receiver means for adjusting the time of reception to alternate at a reference frequency about the time of reception of coherent signals and received non-coherent noise pulses; means coupled to said receiver means for detecting said received time coherent signal pulses plus received non-coherent noise pulses to produce an alternating intermediate frequency signal; and means coupled to said jitter means and detector means for comparing said intermediate and reference frequencies to provide an indication of the presence of a true signal.

References Cited in the file of this patent

UNITED STATES PATENTS

| | | |
|---|---|---|
| 2,446,244 | Richmond | Aug. 3, 1948 |
| 2,467,208 | Hahn | Apr. 12, 1949 |
| 2,491,029 | Brunn | Dec. 13, 1949 |
| 2,494,339 | Keister | Jan. 10, 1950 |
| 2,517,540 | Busignies | Aug. 8, 1950 |
| 2,566,331 | Huber et al. | Sept. 4, 1951 |
| 2,846,676 | Richmond | Aug. 5, 1958 |